United States Patent
Morinaka et al.

(10) Patent No.: US 7,148,926 B2
(45) Date of Patent: Dec. 12, 2006

(54) IMAGE SENSING APPARATUS AND SIGNAL PROCESSING METHOD THEREFOR

(75) Inventors: Yasuhiro Morinaka, Osaka (JP); Hiroyoshi Komobuchi, Kyoto (JP); Akito Kidera, Osaka (JP); Toshiya Fujii, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 820 days.

(21) Appl. No.: 10/311,672

(22) PCT Filed: May 9, 2002

(86) PCT No.: PCT/JP02/04541

§ 371 (c)(1),
(2), (4) Date: Dec. 18, 2002

(87) PCT Pub. No.: WO02/093939

PCT Pub. Date: Nov. 21, 2002

(65) Prior Publication Data

US 2003/0133028 A1    Jul. 17, 2003

(30) Foreign Application Priority Data

May 15, 2001   (JP) ............................. 2001-144384

(51) Int. Cl.
*H04N 3/14* (2006.01)

(52) U.S. Cl. ...................... 348/277; 348/282; 348/312; 348/322

(58) Field of Classification Search ...................... None
See application file for complete search history.

(56) References Cited

U.S. PATENT DOCUMENTS

| | | | |
|---|---|---|---|
| 6,686,960 B1* | 2/2004 | Iizuka | 348/273 |
| 6,992,714 B1* | 1/2006 | Hashimoto et al. | 348/273 |

FOREIGN PATENT DOCUMENTS

| | | | |
|---|---|---|---|
| JP | 11-234688 | | 8/1999 |
| JP | 2000-209599 | | 7/2000 |
| JP | 2001-36920 | | 2/2001 |
| JP | 2001-085664 | * | 3/2001 |
| JP | 2001-111894 | | 4/2001 |
| JP | 2001-156281 | | 6/2001 |
| JP | 2001-292453 | | 10/2001 |

OTHER PUBLICATIONS

International Search Report; PCT/JP02/04541, ISA/JPO, Aug. 9, 2002.

* cited by examiner

*Primary Examiner*—Ngoc Yen Vu
*Assistant Examiner*—Hung H. Lam
(74) *Attorney, Agent, or Firm*—Harness, Dickey & Pierce, P.L.C.

(57) ABSTRACT

A color filter arrangement (11) is used, in which a plurality of filter units are each made of 2×2 arrangements of red (R), green (G), green (G) and blue (B) color elements. First, signal charges are added up for all pixels belonging to each of a plurality of pixel blocks made of quadratic arrangements of 3×3 of pixels, which are larger than the filter units (2×2 arrangement). Then, compressed color information for each of the pixel blocks is obtained from a result of the addition for each pixel block, taking the 2×2 arrangements of pixel blocks as large filter units.

6 Claims, 10 Drawing Sheets

R: RED
Gr/Gb: GREEN
B: BLUE

MODE 1

MODE 2

R: RED
Gr/Gb: GREEN
B: BLUE $$\begin{pmatrix} A \\ Ba \\ Bc \\ C \end{pmatrix} = \begin{pmatrix} 4 & 2 & 2 & 1 \\ 2 & 4 & 1 & 2 \\ 2 & 1 & 4 & 2 \\ 1 & 2 & 2 & 4 \end{pmatrix} \begin{pmatrix} R^* \\ Gr^* \\ Gb^* \\ B^* \end{pmatrix}$$

$$\begin{pmatrix} R^* \\ Gr^* \\ Gb^* \\ B^* \end{pmatrix} = 1/9 \begin{pmatrix} 4 & -2 & -2 & 1 \\ -2 & 4 & 1 & -2 \\ -2 & 1 & 4 & -2 \\ 1 & -2 & -2 & 4 \end{pmatrix} \begin{pmatrix} A \\ Ba \\ Bc \\ C \end{pmatrix}$$

Mg: MAGENTA
G: GREEN
Cy: CYAN
Ye: YELLOW

IMAGE SENSING APPARATUS AND SIGNAL PROCESSING METHOD THEREFOR

TECHNICAL FIELD

The present invention relates to image sensing apparatuses for color image sensing and signal processing methods for the same.

BACKGROUND ART

In single-plate solid-state image sensing apparatuses, a color filter arrangement is placed on a single image sensing element. In CCD (charge coupled device) image sensing elements, for example, a plurality of photodiodes (PDs) are arranged two-dimensionally, vertical CCDs (VCCDs) are arranged with respect to the vertical columns of these PDs, and one horizontal CCD (HCCD) is coupled to one end of all these VCCDs. The PDs constitute pixels for converting incident light into signal charges corresponding to the light amount. The color filter arrangement includes a plurality of filter units that are arranged two-dimensionally. For example, the plurality of filter units may each be made of a 2×2 arrangement of a first, a second, a third and a fourth color element, and may be arranged on the image sensing element so that those color elements correspond to the respective pixels of the image sensing element. In the color filter arrangement referred to as the Bayer arrangement of primary colors, the first, second, third and fourth color elements have, for example, selective transmissivity for red (R), green (G), green (G) and blue (B), respectively. For convenience, the G's that are flanked by two R's are denoted as "Gr," whereas the G's that are flanked by two B's are denoted as "Gb." Furthermore, as a complementary color filter arrangement, a color filter arrangement is known, in which the first, second, third and fourth color elements have selective transmissivity for magenta (Mg), green (G), cyan (Cy) and yellow (Ye).

In recent years, image sensing elements are provided with ever higher numbers of pixels, in order to realize image sensing with ever higher resolutions. At present, digital still cameras (DSCs) equipped with CCD image sensing elements with 2 million pixels or 4 million pixels are on the market, and prototypes of image sensing elements having more than 10 million pixels have been reported.

On the other hand, DSCs are required to provide not only still pictures, but also moving pictures. In the case of still picture image sensing, there are hardly any temporal restrictions after the shutter has been closed, so that it is possible to individually read out the signal charges of all pixels using the VCCDs and the HCCD at a slow pace in case of image sensing elements with large numbers of pixels. But in a monitoring mode for example, in which moving pictures of the object are displayed on a liquid crystal monitor so as to monitor the most suitable moment to take a picture, the maximum driving frequency of the VCCDs and the HCCD is limited by the frequency characteristics of the amplifier that is provided on the output side of the HCCD, and as a result, the frame rate of moving pictures decreases as the number of pixels of the imaging element increases.

To address this problem, the technique disclosed in JP 2000-209599A (publication date: 28 Jul. 2000) proposes that in the monitoring mode, for every three columns, the transfer of signal charges from the VCCDs to the HCCD is prohibited for two columns. Thus, the signal charges of the pixels of two columns are discarded for every three columns, and as a result, the frame rate can be increased. It is furthermore known to increase the frame rate by discarding the signal charges of pixels of two rows for every three rows in the VCCDs. Furthermore, as long as filter units made of 2×2 arrangements of color elements are adopted, the desired color information can be obtained from the remaining signal charges that have not been discarded.

However, employing a technique of selectively discarding signal charges of pixels as described above worsens the light utilization efficiency, and there is the problem that it is in particular not suitable for image sensing at low illumination. Moreover, if the signal charges of pixels are discarded for only rows or only columns, then the spatial frequency characteristics in the vertical direction or the horizontal direction become unbalanced, and as a result, the image quality becomes poor.

DISCLOSURE OF THE INVENTION

It is an object of the present invention to provide an image sensing apparatus having an image sensing element with many pixels, with which the light utilization efficiency can be improved while increasing the frame rate during moving picture image sensing, and deterioration of video quality can be prevented.

In order to achieve this object, in accordance with the present invention, signal charges are added up for all pixels belonging to each of a plurality of pixel blocks made of quadratic arrangements of odd number×odd number of pixels, which are larger than the filter units (2×2 arrangement).

More specifically, an image sensing apparatus for color image sensing in accordance with the present invention includes an image sensing element having a plurality of pixels that are arranged two-dimensionally so that each converts incident light into signal charges corresponding to the light amount; a color filter arrangement having a plurality of filter units that are arranged two-dimensionally, wherein each of the plurality of filter units is made of a 2×2 arrangement of a first, a second, a third and a fourth color element and placed on the image sensing element so that each of the color elements corresponds to a pixel of the image sensing element; a driving circuit for driving the image sensing element such that the plurality of pixels of the image sensing element are grouped into a plurality of pixel blocks made of quadratic arrangements of odd number×odd number of pixels, which are larger than the filter units, and for each of the plurality of pixel blocks, the signal charges of all pixels belonging to that pixel block are added together; and a signal processing circuit for obtaining compressed color information for each of the pixel blocks from a result of the addition for each pixel block, taking 2×2 arrangements of the pixel blocks as large filter units. Each of the plurality of pixel blocks is made of 3×3 pixel arrangements, for example. Two of the first, second, third and fourth color elements may be of the same color.

BEST MODE FOR CARRYING OUT THE INVENTION

The following is a more detailed explanation of the present invention, with reference to the accompanying drawings.

Figure 1:
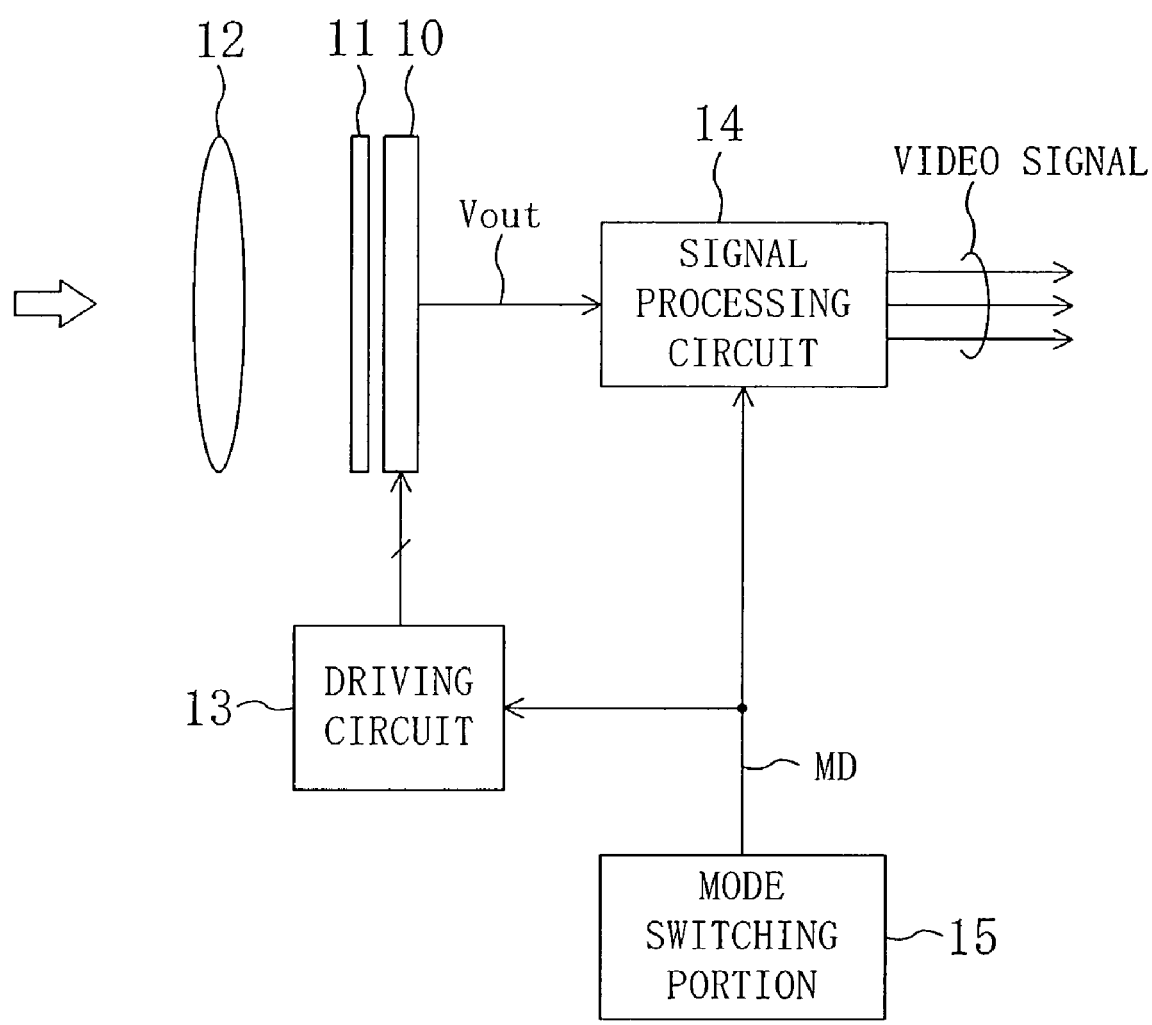
FIG. 1 is a block diagram showing an example of the configuration of an image sensing apparatus in accordance with the present invention.

FIG. 1 schematically shows an example of the configuration of an image sensing apparatus in accordance with the present invention. This image sensing apparatus is a DSC with the ability of color image sensing and having a still picture mode (also referred to as "all pixel mode" or "mode 1") and a moving picture mode (also referred to as "monitoring mode" or "mode 2"), including a CCD-type image sensing element 10, a color filter arrangement 11, a lens 12, a driving circuit 13, a signal processing circuit 14 and a mode switching portion 15. The CCD-type image sensing element 10 is an image sensing element that has a plurality of pixels that are arranged two-dimensionally such that they each convert incident light into signal charges corresponding to the light amount. The color filter arrangement 11 has color elements of at least three colors that are arranged two-dimensionally, and is placed on the image sensing element so that each color element corresponds to a pixel of the image sensing element 10. The lens 12 guides the incident light from the object to the color filter arrangement 11. The driving circuit 13 is a circuit for supplying a plurality of driving pulses for driving the image sensing element 10. The signal processing circuit 14 is a circuit for producing a luminance signal Y and color-difference signals Cr and Cb based on the CCD output signal Vout obtained from the image sensing element 10, and outputting these as a video signal. It should be noted that there are also cases in which an RGB signal is output as the video signal. The mode switching portion 15 is a means for letting the two circuits 13 and 14 operate in the designated mode by supplying a mode signal MD, which indicates whether mode 1 or mode 2 has been designated, to the driving circuit 13 and the signal processing circuit 14.

Figure 2:
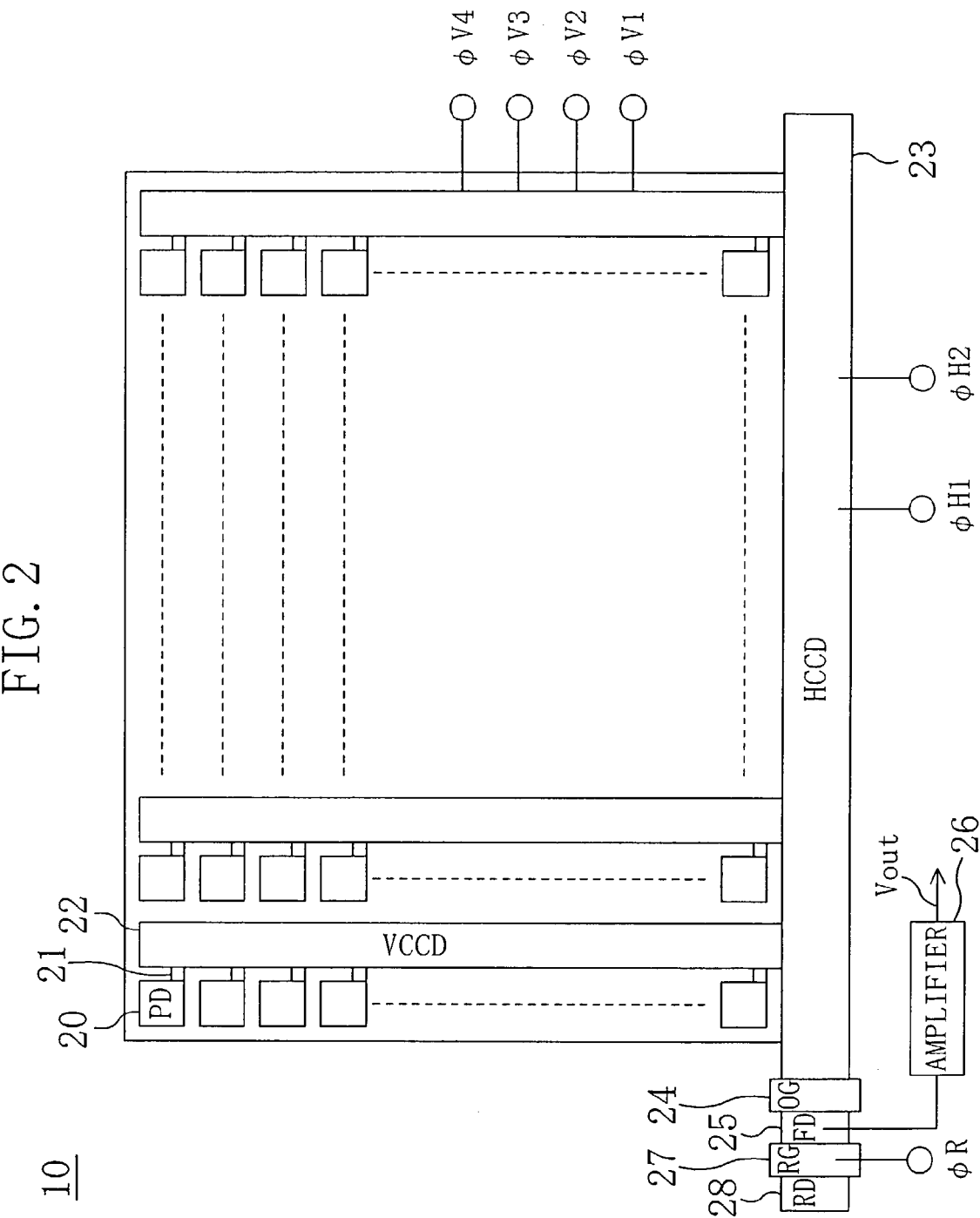
FIG. 2 shows an outline of the configuration of the CCD-type image sensing element in FIG. 1.

FIG. 2 shows an outline of the configuration of the CCD-type image sensing element 10 in FIG. 1. In the image sensing element 10 in FIG. 2, a plurality of PDs 20 are arranged two-dimensionally, and VCCDs 22 are provided in correspondence with vertical columns of those PDs 20. One HCCD 23 is coupled to one end of all the VCCDs 22. The PDs 20 convert incident light into signal charges corresponding to the light amount, and accumulate these. Read-out gates 21 are disposed between the PDs 20 and the VCCDs 22, and the signal charges accumulated in the PDs 20 are read out into the VCCDs 22. Four-phase transfer gates $\phi V1$, $\phi V2$, $\phi V3$ and $\phi V4$ are provided for each PD 20 and of these, $\phi V3$ also serves as the read-out gate 21. the HCCD 23 is provided with two-phase transfer gates $\phi H1$ and $\phi H2$. The charge transfer destination of the HCCD 23 is connected via an output gate (OG) 24 to a floating diffusion (FD) 25. The charges that are collected in the FD 25 are detected and amplified by an amplifier 26 and output as a voltage signal Vout. The charges remaining in the FD 25 are discharged into the reset drain (RD) 28 by applying a reset pulse $\phi R$ to the reset gate (RG) 27. It should be noted that the various driving pulses for the four-phase transfer gates $\phi V1$ to $\phi V4$ of the VCCD 22 and the two-phase transfer gates $\phi H1$ and $\phi H2$ of the HCCD 23, and the reset pulse $\phi R$ for the RG 27 are supplied by the driving circuit 13 in FIG. 1.

Figure 3:
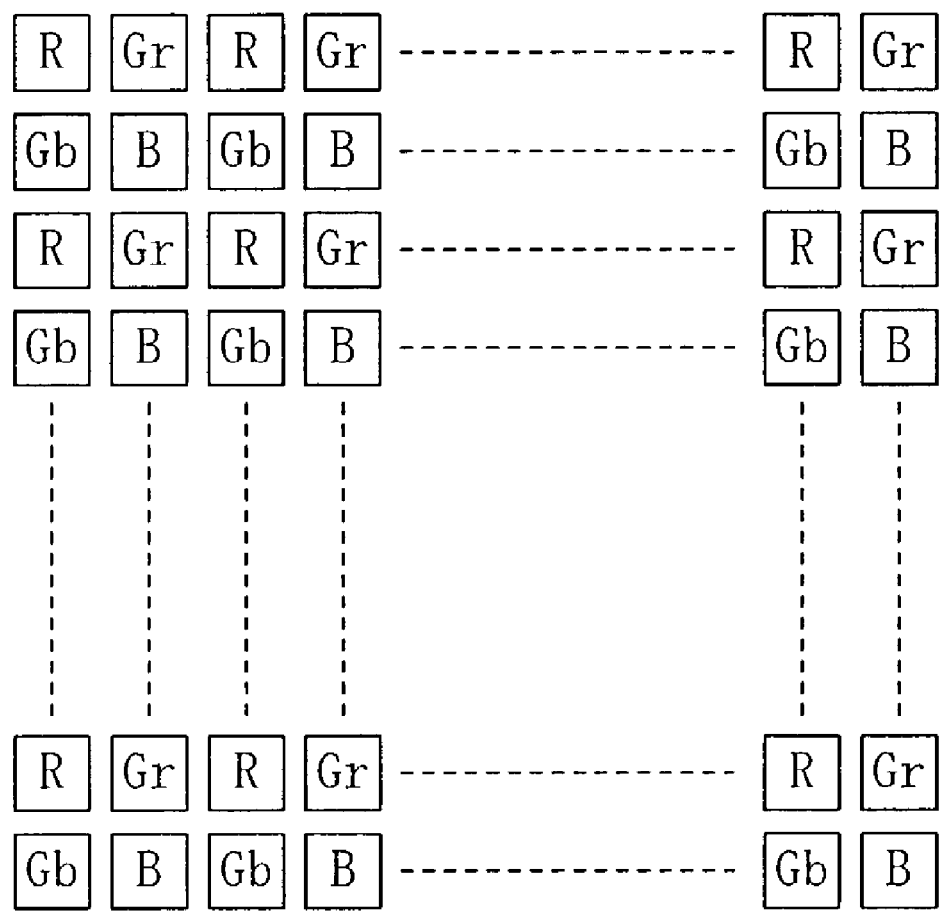
FIG. 3 is a diagram illustrating an example of the color filter arrangement in FIG. 1.

FIG. 3 shows an example of the color filter arrangement 11 in FIG. 1. The color filter arrangement 11 in FIG. 3 is the above-described Bayer arrangement of primary colors, which has a plurality of filter units arranged two-dimensionally, each filter unit being made of a 2×2 arrangement of the color elements R, Gr, Gb and B.

When mode 1 is designated for the DSC in FIG. 1, the driving circuit 13 and the signal processing circuit 14 operate such that separate color information is obtained from the signal charges of each of the individual pixels of the CCD-type image sensing element 10, thus achieving still picture image sensing of high resolution.

Figure 4:
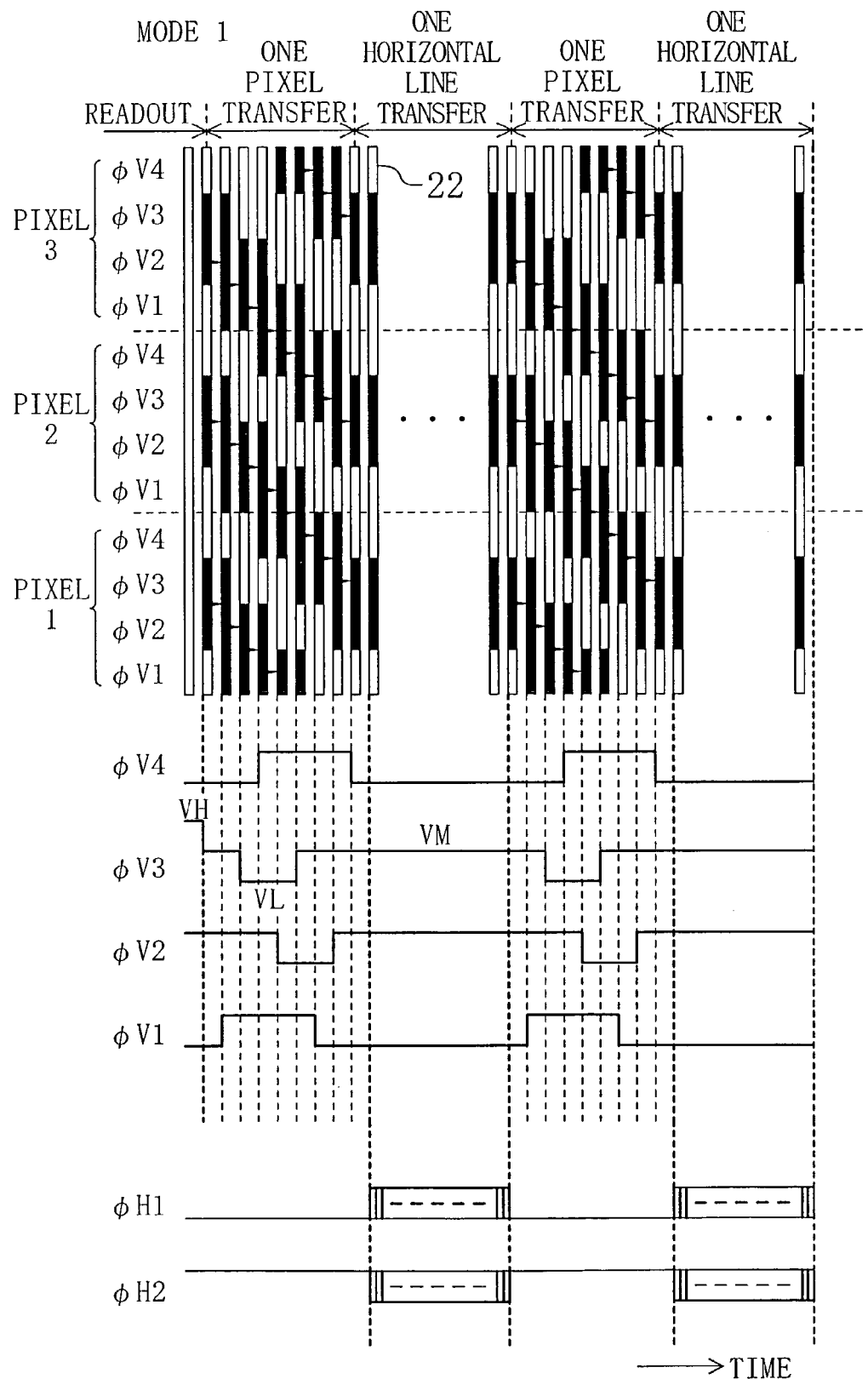
FIG. 4 is a timing chart showing how charges are transferred in the vertical CCD of FIG. 2 in mode 1, together with the driving pulse waveforms.

FIG. 4 illustrates how charges are transferred in mode 1 of the VCCD 22 in FIG. 2, together with the driving pulse waveforms. The upper half of FIG. 4 indicates the flow of the signal charges that have been read out from three PDs (pixels) 20 adjacent to the HCCD 23. The signal charges that have accumulated in the PD 20 are read out into the VCCD 22 by applying a read-out pulse of a high voltage (VH) to $\phi V3$. The signal charges read out to VCCD 22 are transferred for the distance of one pixel in the VCCD 22 by applying $\phi V1$ to $\phi V4$ driving pulses that respectively change to the intermediate voltage (VM) and the low voltage (VL) at the timing shown in FIG. 4. With this operation, the signal charges in the last stage of the VCCDs 22, that is, the signal charges in the PDs 20 in one horizontal line, are transferred into the HCCD 23. Then, after the transfer of one horizontal line with the HCCD 23, the signal charges of the PDs 20 of the next horizontal line are transferred to the HCCD 23. By repeating this operation, the still picture of one screen is obtained.

Figure 5:
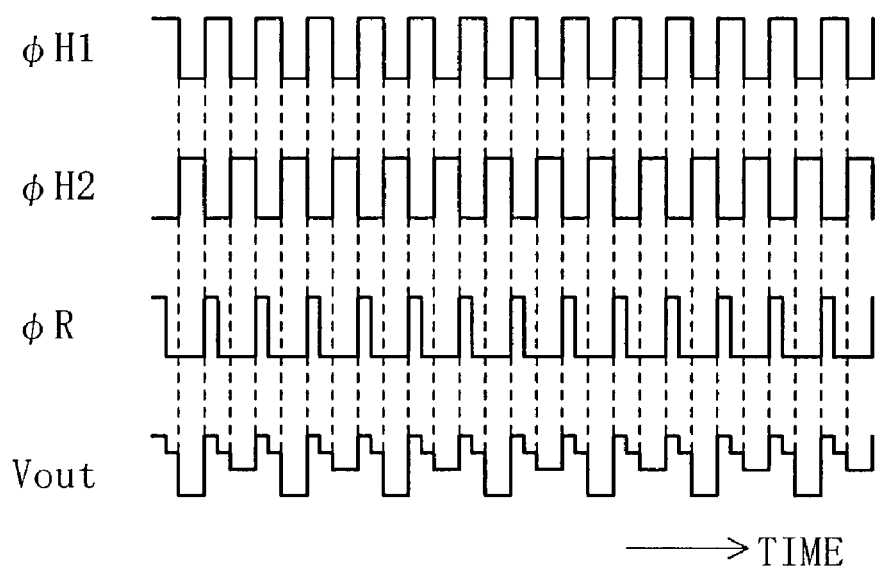
FIG. 5 is a timing chart showing the driving pulse waveforms of mode 1 in the horizontal CCD of FIG. 2, together with the waveform of the CCD output signal.

FIG. 5 shows the driving pulse waveforms of mode 1 in the HCCD 23 of FIG. 2 together with the waveform of the CCD output signal Vout. By applying a binary driving pulse of complementary phases to the transfer gates $\phi H1$ and $\phi H2$, the signal charges that have been transferred into the HCCD 23 are sequentially passed into the OG 24, and collected in the FD 25. The charges that have been collected in the FD 25 are detected and amplified by the amplifier 26, and output as the voltage signal Vout. By applying a reset pulse $\phi R$ to the RG 27 at each transfer of one stage of the HCCD 23, the charges that have accumulated in the FD 25 and have been detected are discharged to the RD 28. By repeating this operation, the signal charges of one horizontal line are detected and output as the voltage signal Vout. It should be noted that the processing in the signal processing circuit 14 is the same as in the conventional art, so that detailed explanations thereof have been omitted.

In mode 2, the driving circuit 13 is operated so as to carry out a signal charge addition in the CCD image sensing element 10 and the signal processing circuit 14 performs corresponding processes, so that moving picture image sensing is realized at a high frame rate and high sensitivity.

Figure 6:
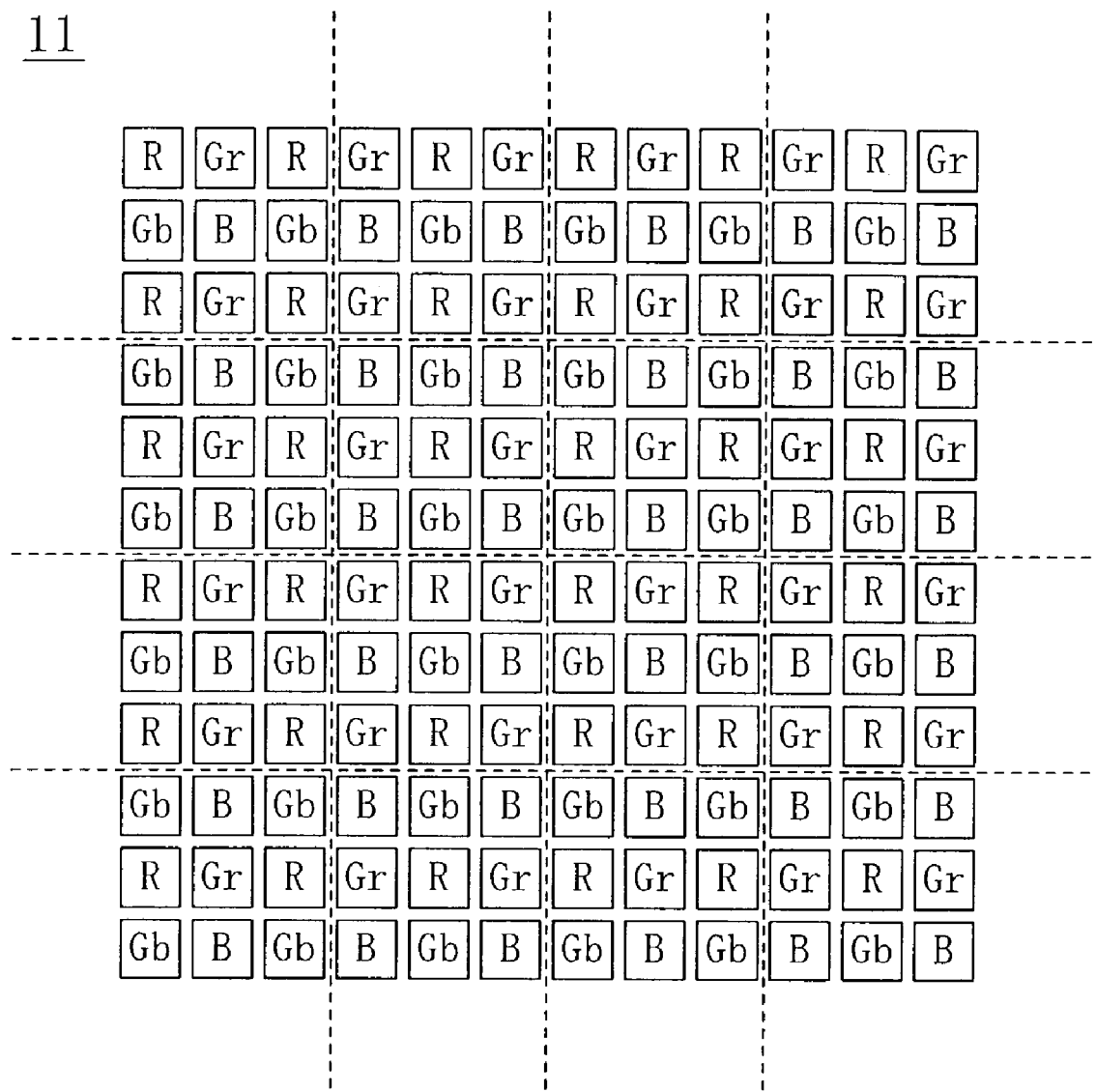
FIG. 6 is a diagram illustrating the regions of signal charge addition for the case that the color filter arrangement in FIG. 3 is used.

FIG. 6 shows regions of signal charge additions for the case that the color filter arrangement 11 in FIG. 3 is used. A plurality of pixels of the image sensing element 10 are grouped into a plurality of pixel blocks in quadratic arrangements of 3×3 pixels. In FIG. 6, the corresponding color element blocks are indicated by broken lines. The color element block (first color element block) in the upper left corner in FIG. 6 includes four R's, two Gr's, two Gb's and one B. The color element block to the right of that (second color element block) includes two R's, four Gr's, one Gb and two B's. The color element block below the first color element block (third color element block) includes two R's, one Gr, four Gb's and two B's. The color element block to the right of that (fourth color element block) includes one R, two Gr's, two Gb's and four B's. When the results of the signal charge additions in the first to fourth pixel blocks corresponding to these first to fourth color element blocks are denoted as A, Ba, Bc and C, and the new color information of the region of 6×6 pixels is denoted as R*, Gr*, Gb* and B*, then the following equations hold:

$$A=4R^*+2Gr^*+2Gb^*+1B^* \quad (1)$$

$$Ba=2R^*+4Gr^*+1Gb^*+2B^* \quad (2)$$

$$Bc=2R^*+1Gr^*+4Gb^*+2B^* \quad (3)$$

$$C=1R^*+2Gr^*+2Gb^*+4B^* \quad (4)$$

The driving circuit 13 drives the image sensing element 10 such that for each of the plurality of pixel blocks, the signal charges of all pixels belonging to that corresponding block are added together.

Figure 7:
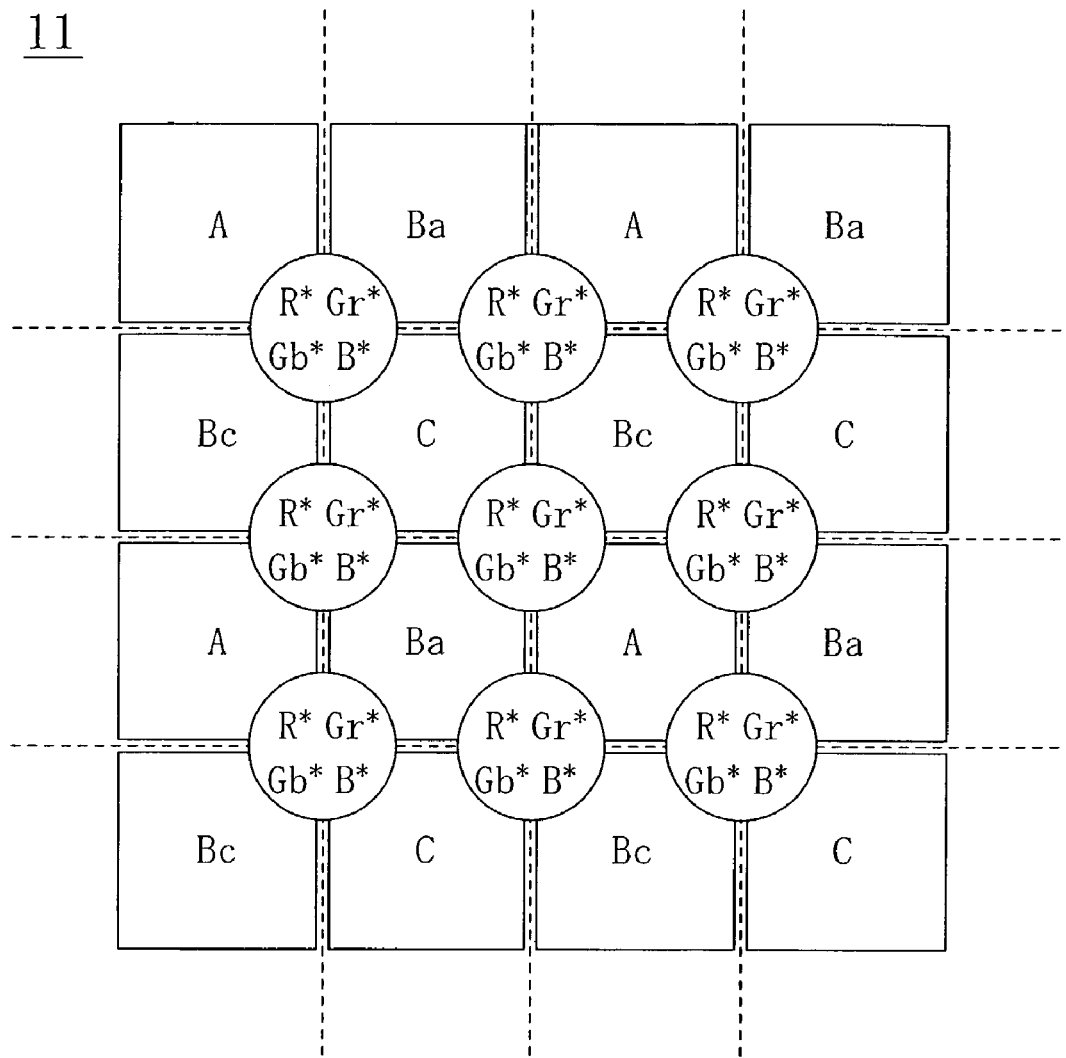
FIG. 7 is a diagram illustrating the result of the signal charge addition based on FIG. 6.

FIG. 7 shows the result of the signal charge addition based on FIG. 6. Solving the equations (1) to (4) for R*, Gr*, Gb* and B* yields the following equations:

$$R^*=(4A-2Ba-2Bc+1C)/9 \quad (5)$$

$$Gr^*=(-2A+4Ba+1Bc-2C)/9 \quad (6)$$

$$Gb^*=(-2A+1Ba+4Bc-2C)/9 \quad (7)$$

$$B^*=(1A-2Ba-2Bc+4C)/9 \quad (8)$$

After the signal processing circuit 14 has obtained in accordance with the equations (5) through (8), from the result of the signal charge addition for each pixel block, the color information R*, Gr*, Gb* and B* that has been compressed for each corresponding pixel block, taking 2×2 arrangement of pixel blocks, that is, regions of 6×6 pixels as large filter units, the Y/Cr/Cb video signals or RGB video signals are produced in the same manner as conventionally.

Figure 9:
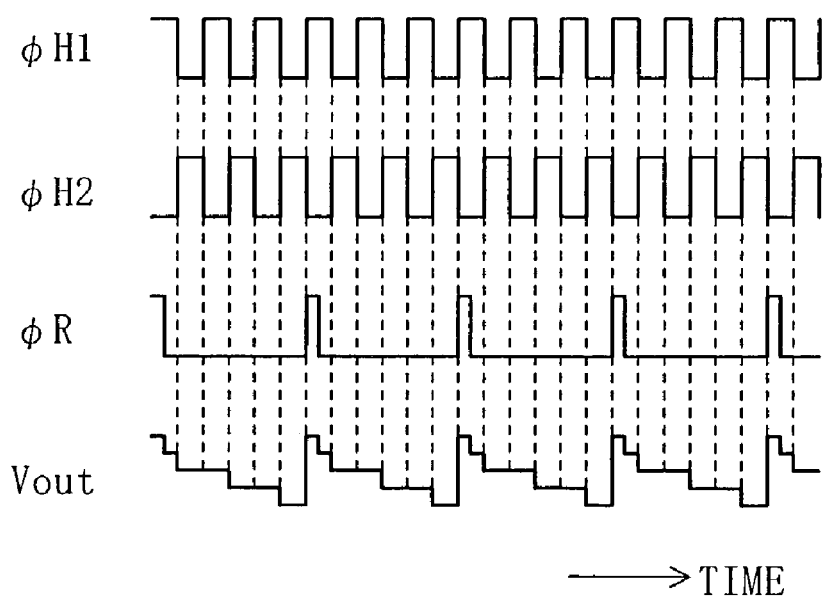
FIG. 9 is a timing chart showing the driving pulse waveforms of mode 2 in the horizontal CCD of FIG. 2, together with the waveform of the CCD output signal.
Figure 8:
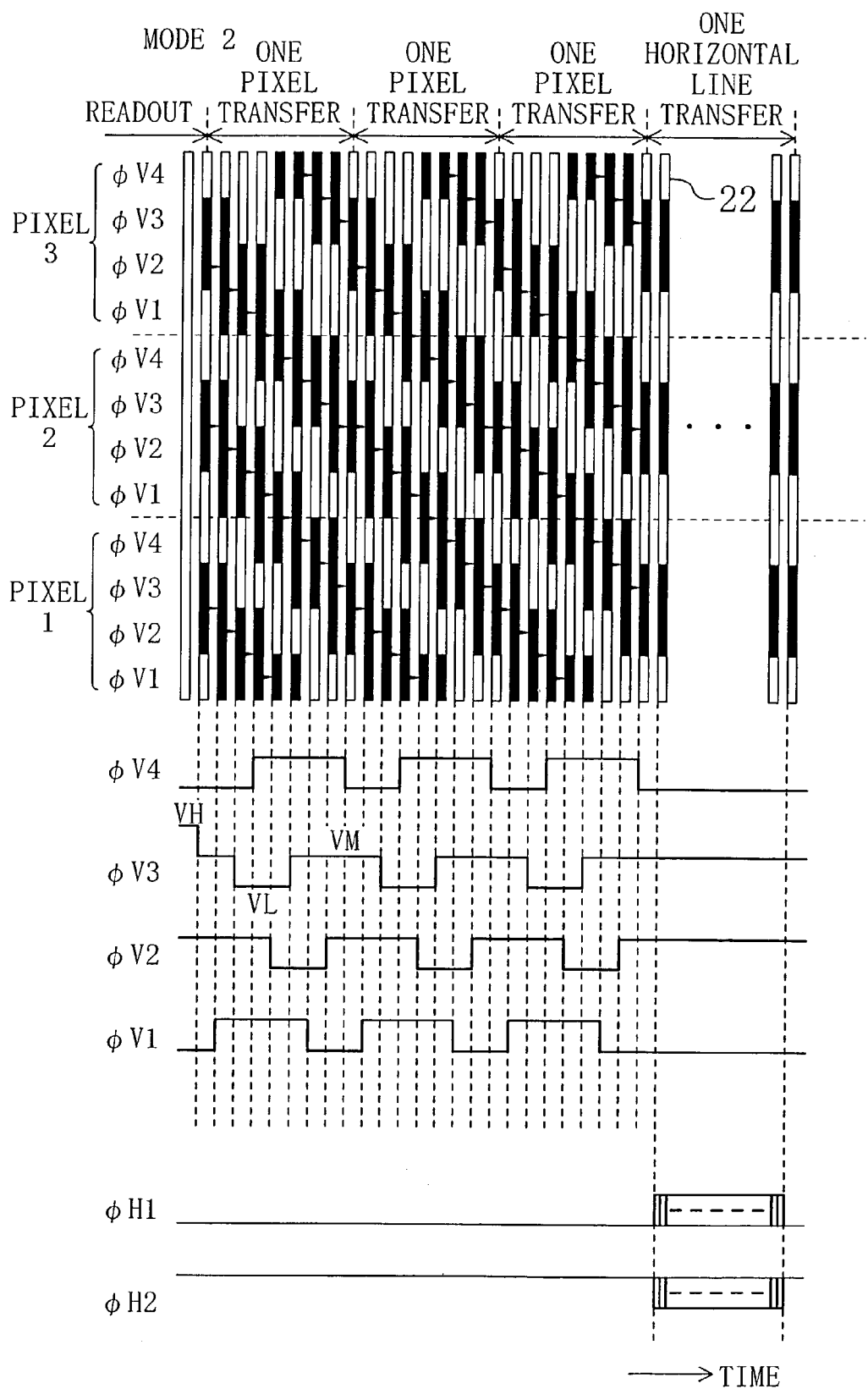
FIG. 8 is a timing chart showing how charges are transferred in the vertical CCD of FIG. 2 in mode 2, together with the driving pulse waveforms.

The following is a simple description of an example of a method for adding the signal charges of each pixel block using FIG. 8 and FIG. 9. FIG. 8 illustrates how charges are transferred in mode 2 in the VCCDs 22. The addition of signal charges in the vertical direction is performed in the HCCD 23, by continuously transferring the signal charges of three pixels from the VCCDs 22 into the HCCD 23. FIG. 9 shows the driving pulse waveform for the HCCD 23 in mode 2. The addition of signal charges in the horizontal direction is performed on the input side of the amplifier 26, by applying the reset pulse φR at a ratio of once per transfer of three stages of the HCCD 23.

As can be seen by comparing FIG. 4 and FIG. 8, the number of horizontal line transfers with the HCCD 23 in mode 2 is one third the number in mode 1. The time needed for the transfer of the signal charges of one or three pixels with the VCCDs 22 is sufficiently short when compared to the time needed for the transfer of one horizontal line with the HCCD 23. Consequently, with mode 2, it is possible to attain a frame rate that is about three times higher than in the case of carrying out the signal charge addition for each pixel block. Furthermore, also in mode 2, the signal charges of all pixels are utilized efficiently, so that the light utilization efficiency is improved, and this method is also suitable for image sensing at low illumination. Furthermore, the spatial frequency characteristics of the images in the vertical direction or the horizontal direction do not become unbalanced.

Figure 10:
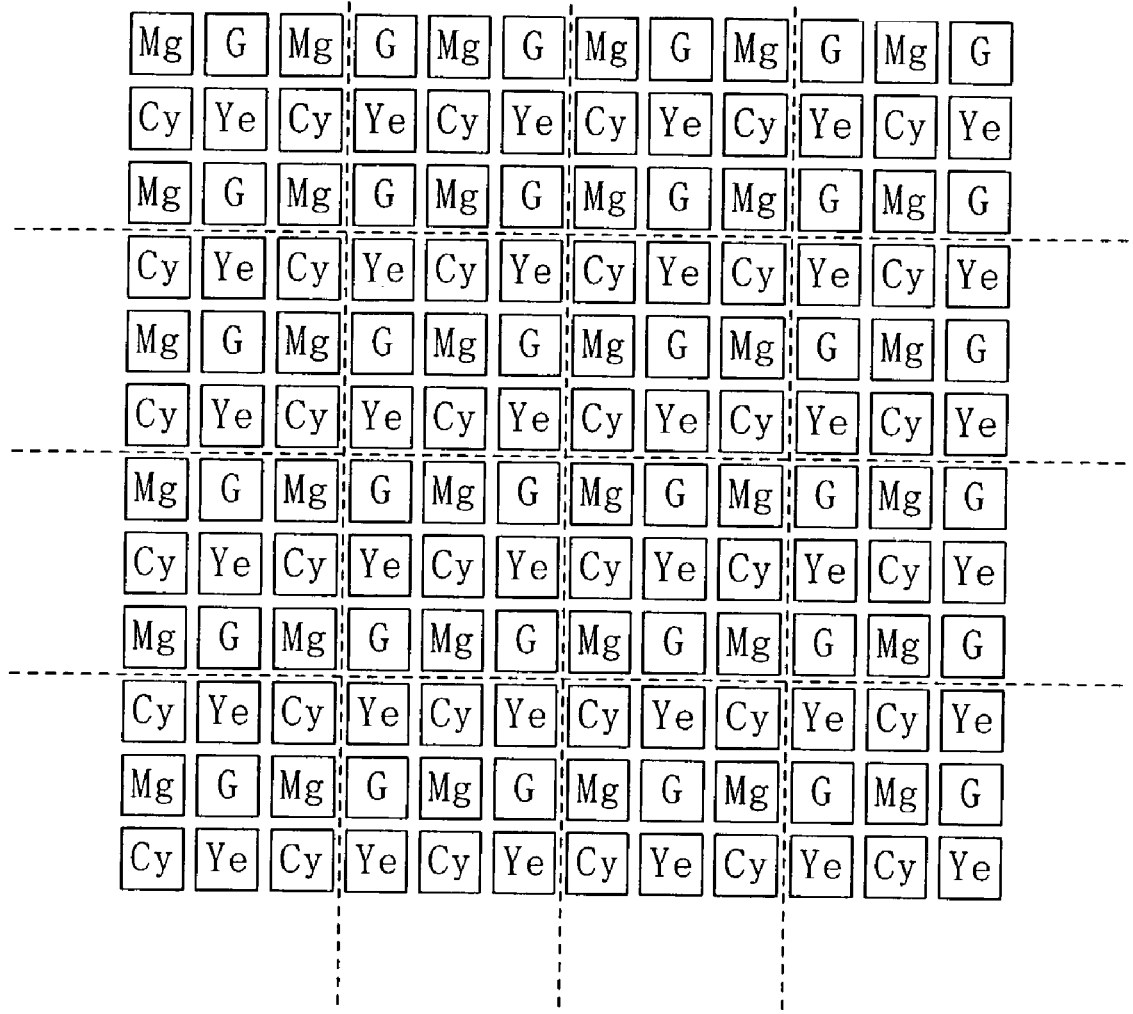
FIG. 10 is a diagram illustrating the regions of signal charge addition for the case that a complementary color filter arrangement is used instead of the color filter arrangement in FIG. 3.
Figure 11:
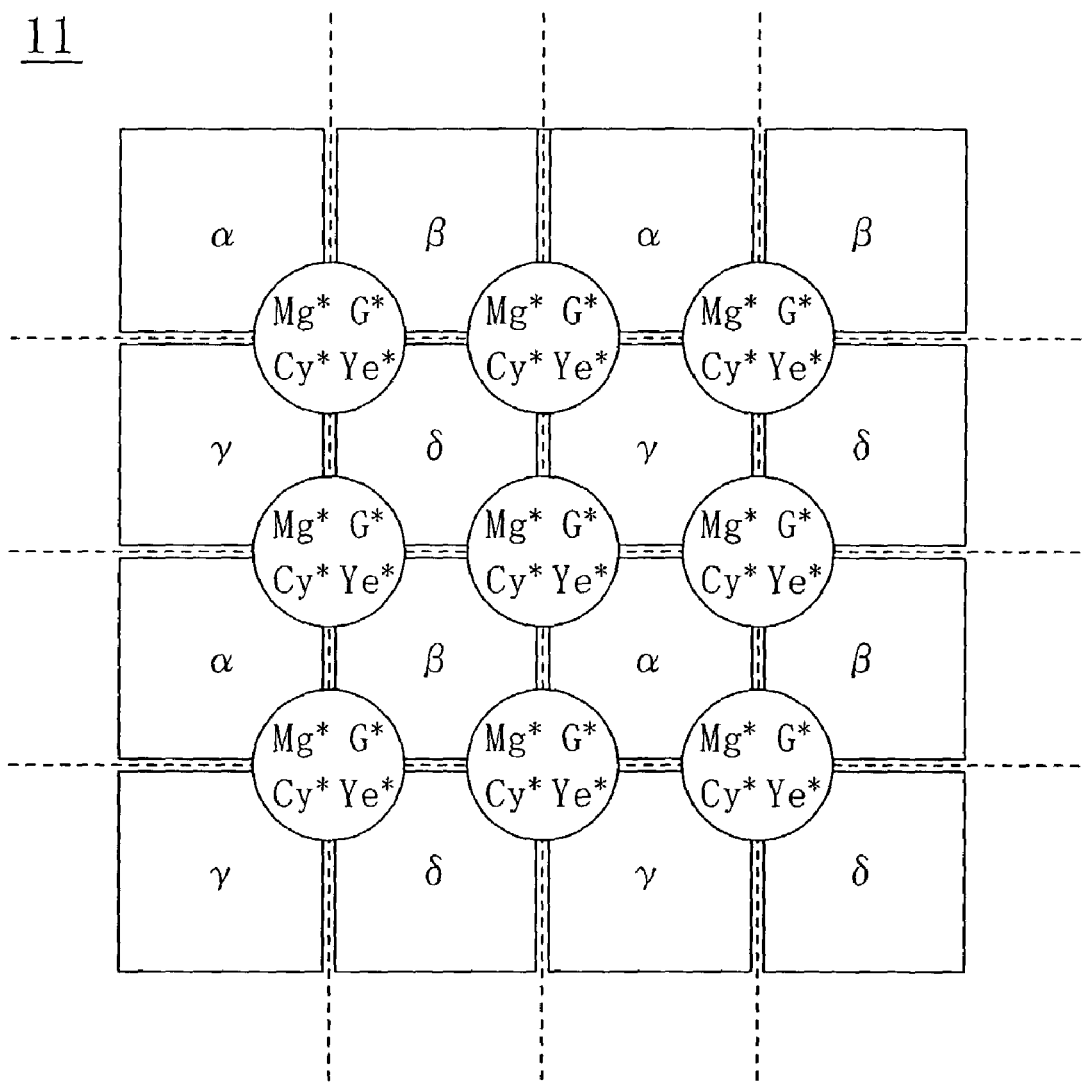
FIG. 11 is a diagram illustrating the result of the signal charge addition based on FIG. 10.

It should be noted that the color filter arrangement 11 is not limited to the Bayer arrangement of primary colors shown in FIG. 3. For example, it is also possible to adopt the above-mentioned complementary color filter arrangement of Mg, G, Cy and Ye. FIG. 10 and FIG. 11 are drawings of the case that such a complementary color filter arrangement is used. In mode 2, the signal charge addition results α, β, γ, and δ of each pixel block and the new color information Mg*, G*, Cy* and Ye* give the equations:

$$\alpha=4Mg^*+2G^*+2Cy^*+1Ye^* \quad (9)$$

$$\beta=2Mg^*+4G^*+1Cy^*+2Ye^* \quad (10)$$

$$\gamma=2Mg^*+1G^*+4Cy^*+2Ye^* \quad (11)$$

$$\delta=1Mg^*+2G^*+2Cy^*+4Ye^* \quad (12)$$

And these equations (9) to (12) yield the equations:

$$Mg^*=(4\alpha-2\beta-2\gamma+1\delta)/9 \quad (13)$$

$$G^*=(-2\alpha+4\beta+1\gamma-2\delta)/9 \quad (14)$$

$$Cy^*=(-2\alpha+1\beta+4\gamma-2\delta)/9 \quad (15)$$

$$Ye^*=(1\alpha-2\beta-2\gamma+4\delta)/9 \quad (16)$$

The signal processing circuit 14 obtains the compressed color information Mg*, G*, Cy* and Ye* of each pixel block in accordance with the equations (13) through (16). It should be noted that it is also possible to change the 16 coefficients in the equations (13) through (16) as appropriate for human visual performance. The same is true for the coefficients in equations (5) through (8). Furthermore, it is also possible to adopt for example 5×5 pixel arrangements as the size of the pixel blocks.

Furthermore, the present invention is not limited to DSCs, but can also be applied to video cameras. In that case, moving picture image sensing with high resolution and low frame rate can be achieved with mode 1, and moving picture image sensing with low resolution and high frame rate can be achieved with mode 2.

Furthermore, the present invention is not limited to the CCD-type image sensing element 10, and can also be applied to image sensing apparatuses equipped with other kinds of image sensing elements, such as MOS image sensors, as long as they are provided with means for adding, or adding and averaging, signal charges.

INDUSTRIAL APPLICABILITY

With the present invention, signal charges are respectively added up for all pixels belonging to each of a plurality of pixel blocks made of quadratic arrangements of odd number×odd number of pixels, which are larger than the filter units (2×2 arrangement), so that the light utilization efficiency can be improved while increasing the frame rate for moving picture image sensing, and deterioration of the video quality can be prevented. Consequently, the present invention can be suitably applied to DSCs having a monitoring mode.

The invention claimed is:

1. An image sensing apparatus for color image sensing, comprising:
   an image sensing element having a plurality of pixels that are arranged two-dimensionally so that each converts incident light into signal charges corresponding to the light amount;
   a color filter arrangement having a plurality of filter units that are arranged two-dimensionally wherein each of the plurality of filter units is made of a 2×2 arrangement of a first, a second, a third and a fourth color element and placed on the image sensing element so that each of the color elements corresponds to a pixel of the image sensing element;
   a driving circuit for driving the image sensing element such that the plurality of pixels of the image sensing element are grouped into a plurality of pixel blocks made of quadratic arrangements of odd number (2n+1, where n is an integer of 1 or more)× odd number (2n+1) of pixels, which are larger than the filter units, and for each of the plurality of pixel blocks, the signal charges of all pixels belonging to that pixel block are added together, wherein the pixel blocks adjacent to each other do not overlap at all; and
   a signal processing circuit for obtaining compressed color information for each of the pixel blocks from a result of the addition for each pixel block, taking 2×2 arrangements of the pixel blocks as large filter units, wherein each of the large filter units is made of (4n+2)×(4n+2) of pixels.

2. The image sensing apparatus according to claim 1, further comprising a means for controlling the driving circuit and the signal processing circuit such that separate color information is obtained from the signal charges of the individual pixels of the image sensing element, regardless of the addition for each pixel block.

3. The image sensing apparatus according to claim 1, wherein each of the plurality of pixel blocks is made of a 3×3 pixel arrangement.

4. The image sensing apparatus according to claim 1, wherein the first, second, third and fourth color elements have selective transmissivity for red, green, green and blue, respectively.

5. The image sensing apparatus according to claim 1, wherein the first, second, third and fourth color elements have selective transmissivity for magenta, green, cyan and yellow, respectively.

6. A signal processing method for an image sensing apparatus comprising an element having a plurality of pixels that are arranged two-dimensionally so that each converts incident light into signal charges corresponding to the light amount, and a color filter arrangement having a plurality of filter units that are arranged two-dimensionally and each made of a 2×2 arrangement of color elements, wherein the color elements are placed on the image sensing element so that each of the color elements corresponds to a pixel of the image sensing element, wherein the signal processing method comprises the steps of:
   grouping the plurality of pixels of the image sensing element into a plurality of pixel blocks made of quadratic arrangements of odd number (2n+1, where n is an integer of 1 or more) ×odd (2n+1) number of pixels, which are larger than the filter units, and for each of the plurality of pixel blocks, adding together the signal charges of all pixels belonging to that pixel block, wherein the pixel blocks adjacent to each other do not overlap at all; and
   obtaining compressed color information for each of the pixel blocks from a result of the addition for each pixel block, taking 2×2 arrangements of the pixel blocks as large filter units, wherein each of the large filter units is made of (4n+2)×(4n+2) of pixels.

* * * * *

UNITED STATES PATENT AND TRADEMARK OFFICE
CERTIFICATE OF CORRECTION

| | |
|---|---|
| PATENT NO. | : 7,148,926 B2 |
| APPLICATION NO. | : 10/311672 |
| DATED | : December 12, 2006 |
| INVENTOR(S) | : Yasuhiro Morinaka et al. |

It is certified that error appears in the above-identified patent and that said Letters Patent is hereby corrected as shown below:

<u>Col. 8</u>

Line 15, Claim 6, insert -- image sensing -- between "an" and "element"

Line 29, Claim 6, "odd (2n+1) number" should be -- odd number (2n+1) --

Signed and Sealed this

Seventeenth Day of April, 2007

JON W. DUDAS
*Director of the United States Patent and Trademark Office*